April 7, 1970          H. J. BRUDNER          3,504,447

ANSWER SYSTEM FOR TEACHING MACHINES

Filed May 31, 1967          2 Sheets-Sheet 1

INVENTOR
HARVEY J. BRUDNER

BY
ATTORNEY

INVENTOR
HARVEY J. BRUDNER

ATTORNEY

United States Patent Office 3,504,447
Patented Apr. 7, 1970

3,504,447
ANSWER SYSTEM FOR TEACHING MACHINES
Harvey Jerome Brudner, Piscataway, N.J., assignor, by mesne assignments, to Westinghouse Learning Corporation, New York, N.Y., a corporation of Delaware
Filed May 31, 1967, Ser. No. 642,491
Int. Cl. G09b 7/02
U.S. Cl. 35—9
6 Claims

ABSTRACT OF THE DISCLOSURE

A motion-picture teaching machine with student-constructed answers to questions. Correctness of answers is evaluated by comparison with correct answers encoded on the film. Substantial information content is disregarded in the registering of the student answer and the coding of the correct answer. A single set of storage elements is used for both answers, the correct answer being encoded as the complement of the changes of state produced by correct-answer operation of a simple form of alpha-numeric keyboard. The advantages of constructed-answer capability over multiple-choice machines are obtained with a minimum of added complexity. The probability of accepting a wrong or randomly-selected answer as correct is negligible, and a correct answer cannot be rejected as incorrect.

---

This invention relates to teaching machines of the type presenting questions to the student and having provision for the entry of answers. More particularly, the invention relates to such machines wherein the answer is constructed by the student by operation of an alpha-numeric keyboard.

Numerous forms of teaching machines are known having provision for entry by the student of answers to questions presented in audible or visible form. Most known teaching machines of reasonable simplicity are limited to the entry of answers to multiple-choice questions. There are numerous types of subject-matter for which questions in this form are poorly suited, and in addition the restriction to this form of answer represents an obvious constraint in the preparation of teaching-machine materials. Of at least equal importance, multiple-choice answering is well known to have serious disadvantages flowing from the possibility of guessing or randomly selecting correct answers, particularly by unmotivated students.

Teaching machines for the presentation of organized instructional material, with an answer entry and evaluation provision, normally operate in such a manner that the correct answer to a question must be entered by the student before progressing to the next lesson material. A wrong answer commonly results in the presentation of auxiliary or remedial lesson material, at the end of which the question which was wrongly answered is again presented, and the correct answer then permits progress to the next lesson. With such a mode of operation, the consequences of entry of answers by guessing or random-selection can be serious to the point of making the machine useless. A variety of attempts to deal with this problem, particularly to permit utilization of such machines by students of low motivation, has been made, but restriction of questions and answers to multiple-choice format remains a serious limitation on utility of teaching machines so restricted.

Both for the reasons just mentioned and for more subtle psychological reasons relating to learning-retention, it is now well known that student construction of answers is a virtual necessity for general-purpose use of teaching machines, and there are numerous machines employing a typewriter keyboard for the entry of student answers. In these machines, the typewriter keyboard is used as the input to a digital computer, in which the student answer is recorded in an alpha-numeric computer code and compared with the correct answer.

Both because of the typing-skill problem and considerations of cost and complexity, the desirability of some simpler system for constructed-answer entry and comparison has long been known, and attempts have been made to solve the problem. As one example, U.S. Patent 3,052,041 shows a system in which the number of actuators is reduced as compared with ordinary typewriter keyboards by assigning different alpha-numeric characters to each key upon the presentation of each new question, the character represented by each key in making each answer being indicated adjacent to the key along with projection of the question. Although this permits some simplification and reduction of storage and registering elements as compared with a computer-type full-keyboard system, the reduction of skill requirement in entry of answers is accomplished by sacrifice of the possibility of development of sufficient keyboard familiarity to permit entry of answers rapidly. Other simplified constructed-answer systems heretofore known are subject to similar objections.

The present invention flows from the observation that answer systems for teaching machines heretofore devised have been unnecessarily constrained by undue conformity to the concept of an "answer" as this term is normally used. In ordinary non-machine teaching, an "answer" necessarily conveys intelligible information which can be read and understood. In the case of multiple-choice answers, whether entered on a machine or with a pencil, etc., understanding of the answer requires reference to the choices presented in the question. In the use of constructed literal or numerical answers, the intelligence conveyed may be read directly, in the case of handwritten materials, or by interpretation of a code. The requirement of conveying of intelligence is found on analysis to be actually immaterial in the case of a teaching-machine. Full study of the function served by answer-comparison in the teaching machine shows that the registering of answers in a form which is capable of being "read out" to reproduce the intelligence entered by the student is basically wasteful, and that it is unnecessary to record or compare the student answer and the correct answer in any form which is capable of retranslation into an intelligence-bearing group of characters. For purposes of a constructed-answer teaching machine, all functions and advantages of the constructed answer, both mechanical and psychological, are fully accomplished if the intelligible answer is entered at the keyboard, but is transformed into information which portrays the student answer with an information content which may be completely inadequate for retranslation into "intelligence," but is nevertheless sufficient to meet the requirements of assuredly indicating a correct answer as correct, with a very small probability of indicating an incorrect answer as correct. With this combination of the student's mental and manual operations, and internal operation of the machine, the constructed-answer teaching machine may be enormously simplified, serving all the teaching functions heretofore served only by machines with complex information storage.

Preferably, a teaching-machine made in accordance with the invention employs an alpha-numeric keyboard of highly simplified form, having each key associated with a plurality of characters, in a manner generally similar to a "touch-type" telephone. Operation of this keyboard for rapid entry of answers is readily learned with a minimum of practice by virtually any user. This form of keyboard of course inherently discards certain information required for re-creation of "intelligence" of the usual type, but the "answer" is greatly simplified further before being registered and compared with the correct "answer." In one basic form of the invention, the answer code consists merely of counts of the operations of the keys. Obviously, such coding of the answer is essentially impossible to retranslate to the form of a "communication" from the student, i.e., to be rendered intelligible in any ordinary sense. However, even without any substantial care whatever in question preparation, the likelihood of the student's obtaining the right combination of strikings of keys without sufficient knowledge of the answer to constitute a foundation for commencement of the next lesson is essentially (although not theoretically) nonexistent, except in very limited types of instructional material where, for example, the exact order of the characters is of the essence of the learning being tested. Such a count of respective actuator operations may readily be made with a minimum of information-storage capacity. The number of registering elements may be further reduced by interconnecting certain keys or groups of keys so that they affect the registered or encoded student answer identically.

As a further aspect of the invention, the storage facility is additionally reduced by employing a single set of multistate information storage elements for both the answer code and the answer as entered by the student. A correct answer is represented by a single combined state of the individual multi-state elements, the answer code establishing a combination of states of the elements which is complementary to the combination of changes of state produced by student entry of the correct answer on the keyboard. As a simple example, the answer code may consist of a light-aperture mask arranged in rows and columns. The student-answer register may, in this example, consist of small masking elements moved through a discrete distance along respective columns. The right answer in this case would be represented by a particular combination of positions of the opaque masks along the face of the coded answer, the position of each mask along its corresponding column registering the number of actuations of the corresponding keyboard actuator. With the answer mask complementary to the combination of progressions representing the correct answer, i.e., transparent only in the region of the correct count in each column, the blanking out of all light transmission between a single light source and a single light detector may be employed to indicate correctness of the answer.

In the example just mentioned, the student and correct answers are complementary as regards light transmission. However, the same general type of simplicity may be employed with, for example, complementary setting of states of a single set of electrical switches. Suppose, for example, that ten-position switches are used for the registering of the number of actuations of the respective keys. In such a case, a series circuit may be formed through the "ten" contacts to signal correctness of the answer, and the encoded correct answer may set the respective switches to positions $10-n$, where the latter is the number of operations of the particular key in producing the correct answer.

In another aspect of the simplification provided by the present invention, the correct answer is encoded in static form on a dynamically presented medium. In U.S. Patent No. 3,408,749 of the present inventor there is disclosed a motion picture teaching-machine wherein the correct answers are encoded in a serially-read code which passes a detector during the progression of the film in the course of the question preceding the lesson. Within the broader teachings of the present invention, such a code may be employed to alter the register states in the complementary fashion just described. However, in accordance with the teaching of another aspect of the present invention, the answer code is advantageously read from the film in the stationary condition of the latter produced when the film is stopped for presentation of the question. Where a dynamic or serial code is used, it becomes necessary to either provide an auxiliary or buffer storage for one of the answers or to rerun the answer-bearing portion of the lesson in order to permit the student to change an answer once entry has commenced. The employment of the static or parallel answer code eliminates this necessity, permitting direct entry of the keyboard actuator operations and of the encoded answer on the single set of register elements while retaining the ability of the student to void a commenced answer and thereupon commence the entry of a new answer.

Understanding of the invention in more detailed aspects may be obtained from consideration of the embodiment thereof illustrated in the drawing and described below in accordance with the patent laws. The illustrated embodiment incorporates certain features of construction in the nature of improvements which are described and claimed in application Ser. No. 672,483 of Karl Brunell and Vladimir P. Honeiser assigned to the same assignee and filed simultaneously herewith. It will be apparent that such improvements, although further advantageous, are not necessary to practice of the invention as hereinafter defined in the claims.

Figure 1:
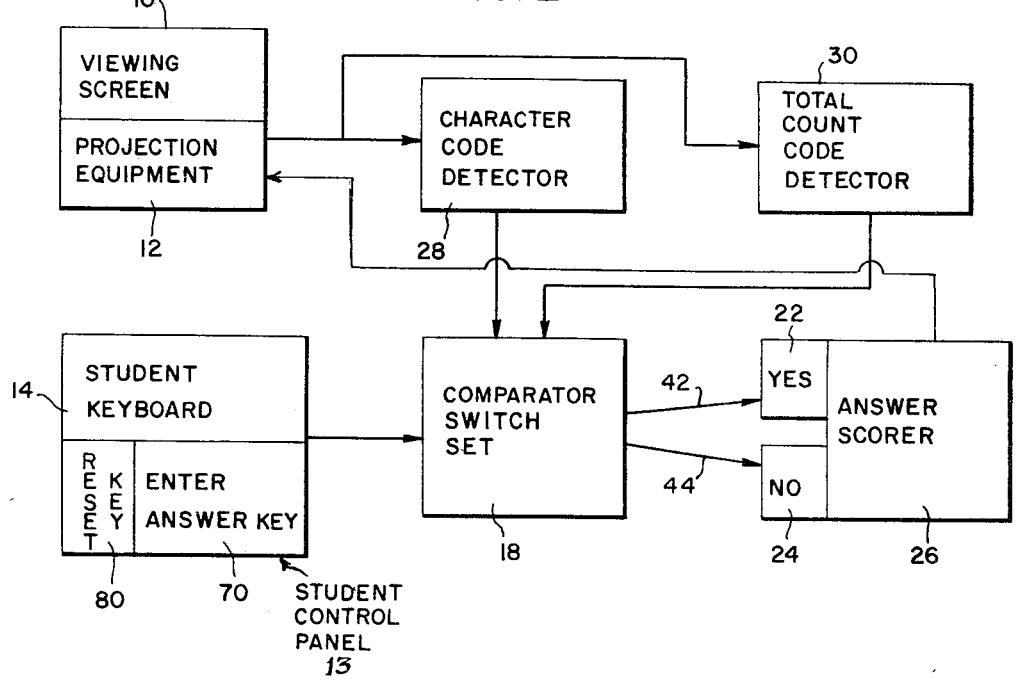
FIGURE 1 is a schematic block diagram of a motion-picture teaching machine embodying the invention.

As may be seen in FIGURE 1, the illustrated teaching machine has a viewing screen 10 associated with motion-picture projection equipment 12. A student control-panel 13 includes a student keyboard 14 for construction of answers, an enter-answer key or button 70, and a reset key or button 80. Correct answers are encoded on the film and detected in a manner hereinafter to be described. If the student makes an error in operating the keyboard (or changes his mind as to the correct answer in the midst of construction of the answer), his answer may be erased or cleared by actuation of the reset key 80. Upon completion of the answer, and operation of the enter-answer key 70, the student answer and the correct answer are compared in a comparator 18 and, dependent upon the result of the comparison, there is produced an output 42 or 44 to a "Yes" or "Correct" indicator 22 or a "No" or "Wrong" indicator 42 of a scorer 26, which in turn, dependent upon the correctness of the answer, selects the next operation of the projection equipment 12.

Figure 2:
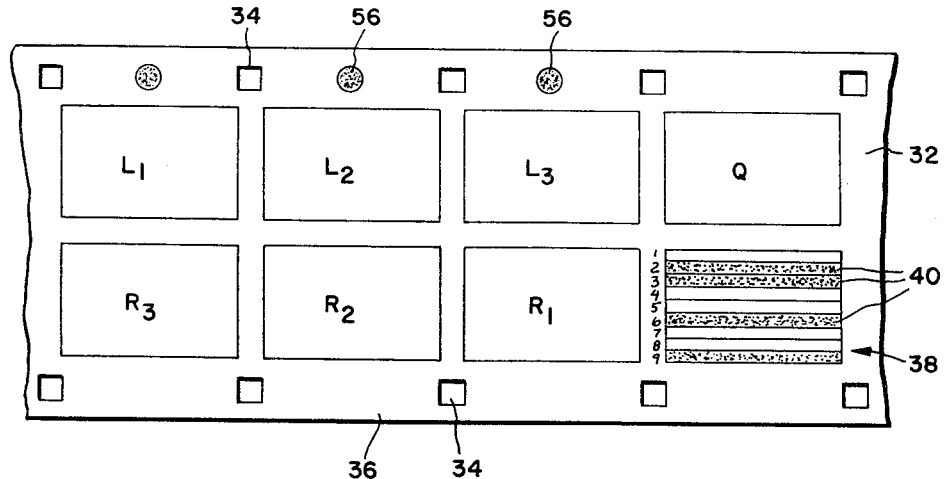
FIGURE 2 is a more or less schematic view of a film employed in the teaching machine.

As seen in FIGURE 2, the film 32 has a main lesson track bearing a series of lessons (only one being illustrated), each having a dynamic lesson sequence schematically indicated at $L_1$, $L_2$, $L_3$, followed by a statically presented question Q. There is also a remedial track for dynamic presentation of remedial material on reversely sequenced frames $R_1$, $R_2$, $R_3$, upon entry of an incorrect answer. As disclosed in the copending application of the same inventor mentioned above, the presentation of the remedial track is followed by repetition of at least the end portion of the lesson, to form an overall remedial "loop" in the event of wrong answer. Sound tracks, not illustrated, are preferably recorded on the margins 36 bearing the film sprocket holes 34.

As in the copending application of the same inventor earlier mentioned, the film 32 bears encoded information as to the correct answer to each question Q. In accordance with the teachings of the invention, the information capacity of the coding is far less than that which would be required to permit translation into alpha-numeric characters constituting an intelligible "answer," merely containing sufficient information regarding the operation of the keys connected with a correct answer to create a very low probability that the student will manipulate the keys in a manner productive of the same information without intention of entering the answer which is actually correct.

Simultaneously with the static display of the question Q, there is internally projected a character code 38 formed by an aperture mask consisting of opaque or transparent bars or stripes 40. Each bar or stripe is identified with one or more keys of the keyboard, and its binary state (opaque or transparent) constitutes a representation of the number of times the corresponding key or keys is or are struck in the correct answer. In the illustrated embodiment, this character count information is represented as a binary code which is single-digit, with the second and successive digits, i.e., the "carry" digits, omitted. The inherent ambiguity of any count thus created is resolved in the manner hereinafter to be described, but it will be noted that even without additional provision, the single binary digits provide sufficient information regarding the correct answer to make the probability of accidental or random construction of an answer meeting the "description" contained in the code far lower than in the case of any multiple-choice answer with a reasonable number of alternative choices. Division of the bars 40 into segments to form a matrix, either to produce further binary code elements for successive carries of each count, or to encode each count in terms of a higher-order number system with digits represented by the position of a single transparent portion of each bar or stripe, may of course be employed if so desired.

Figure 3:
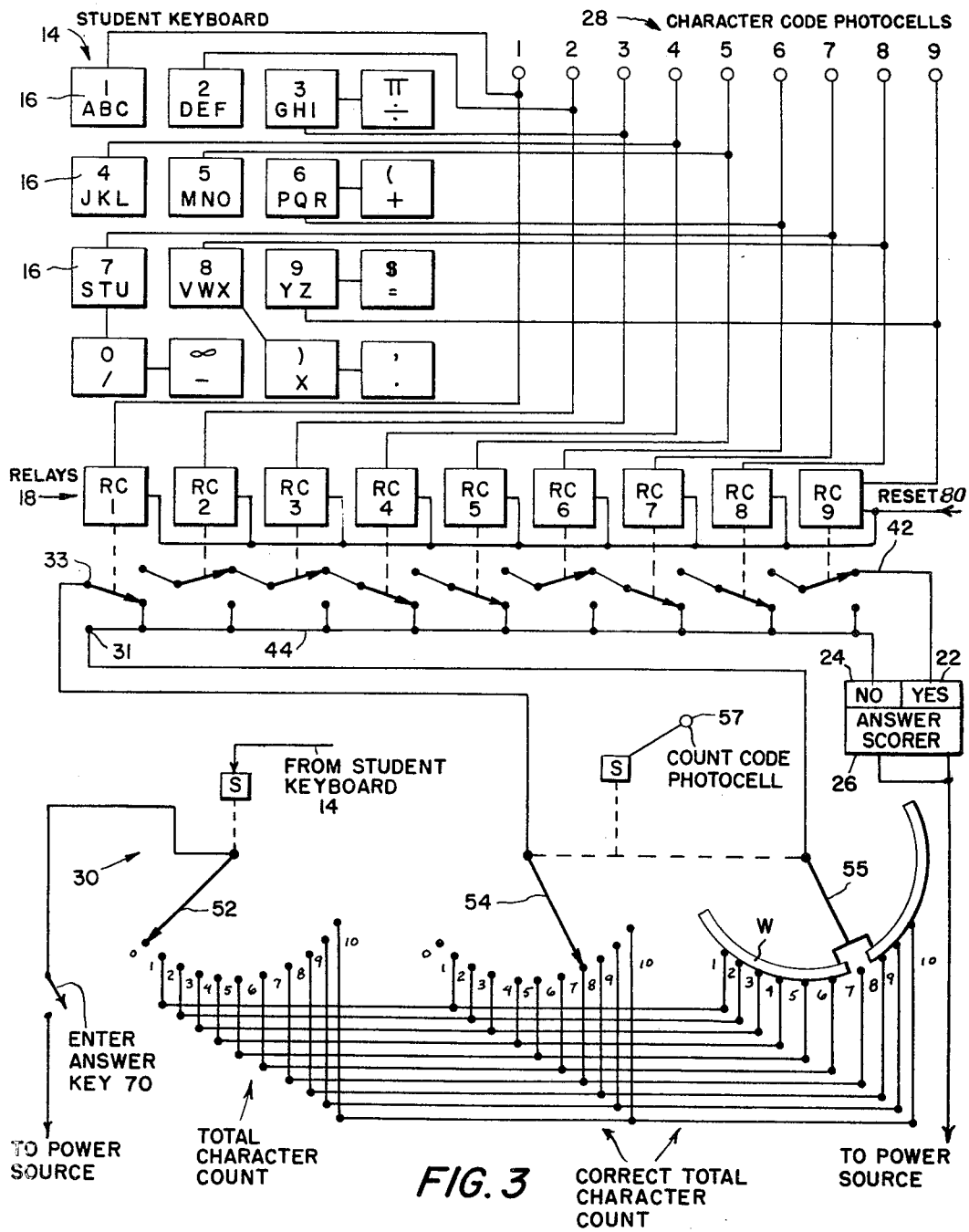
FIGURE 3 is a diagrammatic electrical diagram of an answer entry and comparison system, corresponding to a portion of FIGURE 1.

The answer entry and comparison system is shown schematically in FIGURE 3. The keys or actuators 16 constituting the keyboard 14 are marked with groups of characters generally similar to the manner of marking of a touch-type telephone keyboard, the number of keys being enlarged to 16 to accommodate mathematical symbols and similar additions. In a number of instances, the keys are connected together in parallel, so that their operations are indistinguishable as regards registration in the comparator. For the purpose of machine evaluation of answers on a probability basis, there is no necessary direct relation between the total number of alpha-numeric characters represented on the keyboard, the number of keys, and the number of elements which are used to register separately the number of actuations of the individual keys or groups of keys. In the illustrated embodiment, nine binary register elements are used, corresponding to the nine bars or stripes 40 employed in the character count code 38. On these nine registers are recorded the count from the sixteen keys, illustrated as bearing fifty-one characters. Although less advantageous, a full typewriter keyboard can be employed or, on the other hand, the full alphabet and set of numerical indications, together with such punctuational and mathematical signals as desired, may be incorporated on a smaller number of keys than the number illustrated, and the nine counting registers may be replaced by a larger or smaller number. However, for a general-purpose teaching machine to be used with a large variety of teaching materials, the number of keys should generally be between ten and twenty, and the number of register or counting elements should be greater than four.

Each of the keys 16 is desirably connected to add a count in one of the register elements but selected keys may be connected to change the state of more than one register element, and indeed, if so desired, particular keys (such as a space-bar) may be left unconnected entirely.

In the illustrated embodiment, the multistate counting elements upon which the operations of the keys are registered are illustrated as alternating relays 18, reversing state on each actuation of relay coils $RC_1$ through $RC_9$. It will be understood, however, that this illustration is merely exemplary, any known type of plural-state register elements being usable, such as flip-flop circuits or magnetic memory cores, where the elements are binary; where register elements with a larger number of states are employed, the plural-state counting elements which may be used are likewise of any well-known type. Further, the multistate registers are not limited to electrical registers, the employment of mechanical motions of suitable light masks being an example earlier discussed.

The relay coils $RC_1$ through $RC_9$ are provided with reset inputs simultaneously actuated by the reset key 80 to establish a standard condition. In addition to being stepped or alternated by key operations, they are also responsive to photocells collectively constituting a character code detector 28, these cells being numbered to correspond with the respective relays or register elements in FIGURE 3. When a light source (not illustrated) is flashed through the answer code 38, selected ones of the relays are reversed in condition. The relay contacts are connected to establish a series circuit between end terminals 33 and 42 to signal a correct answer, the single combination condition of all relay contacts producing such a signal being with all movable contacts in the position illustrated as upward in the drawing. In any other condition of any of the contacts, a circuit is established between the point 33 and a line 44 corresponding to the "No" output line of FIGURE 1.

The actuation of the reset button 80 establishes a standard condition of all of the contacts. The flashing of the light, preferably occurring in response to release of the reset button, activates certain of the cells of the detector to reverse the condition of the corresponding contacts. The condition established by the correct answer coding is complementary to the changes of state produced by actuation of the keys corresponding to the correct answer, i.e., the entry of the correct answer produces a series connection between the input at 33 and the "Yes" output at 42. In the case of the binary embodiment illustrated, this complementary position is produced either by making the "Reset" condition correspond to the "Yes" condition, in which case register elements which are to be actuated an odd number of times are represented by transparent stripes 40, or by making the "Reset" position the "No" position of all movable contacts, in which case the register elements to be actuated an odd number of times are represented by opacity of the corresponding film code stripes 40.

As earlier pointed out, since the illustrated device is designed for construction of answers in which any given key may be actuated a number of times, the simple two-state counting registers are inherently ambiguous to some extent, since the same indication will be produced in the registers by any odd number of operations of the associated keys, or by any even number including zero. This recycling ambiguity is of course reduced as the capacity of each register element is increased. If the number of conditions of the relays (or other multistate elements) is raised to 3, the possibility of error due to the recycling ambiguity is reduced, and further reduction is accomplished by successive increasing of the number of states, up to the point where recycling operation is eliminated, each register element having as many distinguishable states as the highest count to be registered.

In the illustrated embodiment, the recycling error is eliminated in a less complex manner by supplementing the count of the binary register elements with a total count of all key operations. As shown in FIGURE 1, the comparator system employs a supplementary total count code detector 30. Suitable light-contact marks 56 appear on the film, and are read out by a count code photocell 57 as the film is progressed for presentation of the lesson. As schematically shown at 52, 54 and 55, these film indications are employed to establish a condition wherein power is fed to the input point 33 of the relay contacts only when the total or aggregate number of actuations of all keys corresponds to the total count information so encoded. As so schematically shown, the switch 52 is driven from the student keyboard 14 to register the total count of keys struck. The switches 54 and 55 have their stationary contacts interconnected and connected to the corresponding contacts of the switch 52. For any given count of the light-actuated pulses of the total count code, the corresponding stationary contact of the switch 52 is connected to the correct answer input 33 to the binary relay contact circuit, while all other stationary contacts of the switch 52 are connected to the "Wrong" or "No" line 44. The movable contact of the counting switch or stepping relay 52 is connected to one side of the power line or source through the enter-answer key 70, while the other side of the power line or source is connected through the scorer 26 to the "Yes" and "No" lines 42 and 44. When the enter-answer key 70 is closed by the student, either the "Yes" or the "No" indicator is actuated. If the contacts of the relays 18 are in the correct position, and the total character count corresponds to the correct character count, the answer is scored as correct, and progression of the film is recommenced in the forward direction. If any one or more of the relays 18 is in the incorrect condition, the answer will be indicated as incorrect even if the total character count at 52 corresponds to the correct character count at 54 and 55. Conversely, if the total character count at 52 fails to correspond to the correct character count at 54 and 55, the answer will be indicated as incorrect even if the relays 18 are in the correct condition as a result of the recycling ambiguity.

The system of FIGURE 3 will be observed to be completely "commutative," i.e., to drop all order-of-entry information in evaluating the correctness of answers. As earlier indicated, this suffices for all but a very few types of teaching materials. In a limited number of types of materials, complete commutativeness of characters is unsatisfactory. As one example, in the teaching of algebra or other mathematical subject-matter, character order can be of the essence of answer correctness, as where the demonstration of absorption of the lesson just administered lies in knowledge of whether a particular number or letter belongs within or without a set of parentheses. Similarly, exact order can be a critical aspect of a learning test in spelling, for example where the lesson material concerns the order of the letters *i* and *e* in the various inversions of this digraph.

Figure 4:
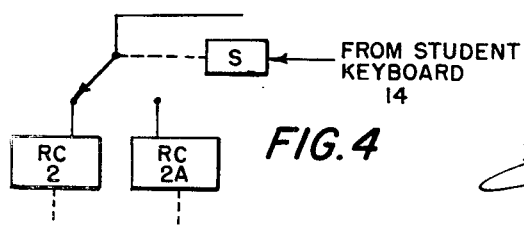
FIGURE 4 is a fragmentary view of an alternate or modified form of the embodiment illustrated.

The invention as thus far described may be modified to accommodate such cases without great addition of complexity. It will be observed that even among types of teaching materials where complete loss of order information is unacceptable, of which examples have just been given, by far the most, if not all, involve only the necessity of detection of reversal of two adjacent characters. In further pursuance to the general teachings of the invention, the order information which is critical in discrimination between correct and incorrect answers for the teaching-machine purpose may be extracted and used without substantial addition to complexity. This may be done by simple discrimination between characters in even positions in the order of entry and characters in odd positions. In the conceptually (but not structurally) simplest implementation, duplicate registers may be provided, with keyboard actuations being alternately routed. Such a construction is shown in FIGURE 4, wherein there is shown a pair of relay coils RC$_2$ and RC$_{2A}$, the former corresponding to the similarly-designated relay (or other counting device) of FIGURE 3, and the latter representing a duplicate. These relays are alternately connected as the student operates the character keys, being switched upon release of any of the character keys after striking. The contacts associated with these two relays are in the same series arrangement as previously described. If so desired, an entire duplicate set may be provided, one for each of the registers earlier described. However, this is generally unnecessary, since the order discrimination in itself acts somewhat like the character discrimination, so that a lesser number of character groups counted on individual registers is required for the same low probability of false correct answers than in the case where order is completely disregarded. Accordingly, suitable switches (manually controlled or operated by film code) can be provided for either commutative or non-commutative operation with a single set of registers such as shown in FIGURE 3. By enlarging the number of keys to which each register responds, but dividing the transmittal of actuations between two sets alternated in operation in accordance with the order of striking of the keys, a similar small probability of reaching a correct-answer combination inadvertently may be obtained in either mode of operation.

It will be obvious to those skilled in the art that the novel "probability" answer system of the invention may be employed in a variety of forms, in some cases far different from the embodiments which have been described herein. Accordingly, the scope of the protection to be given the invention under the patent laws should not be considered as limited by the embodiments described, but should extend to all uses of the teachings of the invention as defined in the appended claims, and equivalents thereof.

What is claimed is:
1. In a teaching machine:
(a) a dynamic-presentation reproducing medium having recorded thereon a series of lessons each terminating in a learning-test question,
(b) means for presenting successive lessons including means for progressing the recording medium for the dynamic presentation and means for stopping the progression at the end of each lesson,
(c) a student keyboard having alpha-numeric characters for construction of multiple character words and similar ordered-character answers, including a plurality of input actuators, at least selected of said actuators being associated with a plurality of the keys of said keyboard and representing a plurality of characters,
(d) correct answers statically encoded on the medium for detection while the medium is stationary,
(e) registering means comprising a single set of multistate elements, each operation of an actuator changing the state of at least one element,
(f) reset means manually operable by a student to void an answer after commencement of entry,
(g) means responsive to the statically encoded answers for establishing a combination of states of elements complementary to the combination of changes of state thereof produced by student entry of the correct answer, and
(h) means responsive only to a single reference combination of states of the elements to signal a correct answer,
whereby answers may be entered, voided, reentered and compared for correctness without the necessity of buffer answer storage or reprogression of the medium.

2. In an instructional system, the combination of:
(a) means for presenting lessons and questions following selected of said lessons,
(b) means for storing the correct encoded answers to said questions,
(c) student response means including a plurality of input actuators for the construction of multiple character words and similar ordered character student answers by the successive activating of selected ones of said plurality of said input actuators, at least selected of said plurality of input actuators representing a plurality of characters,
(d) registering means including a plurality of multistate elements for assuming a predetermined set of states in response to said encoded correct answers and for changing said set of states in response to said student answers, and
(e) means responsive to the changed set of states of said plurality of multistate elements for indicating the correctness or incorrectness of said student answers.

3. The combination of claim 2 wherein:
said registering means includes means for correcting the aggregate number of actuations of particular of said input actuators during the construction of said student answers.

4. The combination of claim 3 wherein:
said means for counting counts the aggregate number of actuations which occur at preselected points in the order of actuations.

5. The combination of claim 2 wherein:
said student response means includes an alpha-numeric keyboard wherein a plurality of characters are represented by at least selected of the keys thereof for activating the same input actuator.

6. The combination of claim 5 wherein:
selected of said keys are so arranged that the operation thereof actuates the same input actuator.

References Cited
UNITED STATES PATENTS

| | | | |
|---|---|---|---|
| 2,857,100 | 10/1958 | Franck et al. | |
| 3,327,405 | 6/1967 | Ingeneri | 35—9 |
| 3,355,818 | 12/1967 | Whitehorn | 35—9 |
| 3,386,187 | 6/1968 | Kilby | 35—9 |
| 3,426,339 | 2/1969 | Rich et al. | 35—35.3 |
| 3,052,041 | 9/1962 | Luxton et al. | 35—9 |

EUGENE R. CAPOZIO, Primary Examiner

W. H. GRIEB, Assistant Examiner